(12) United States Patent
Silverman et al.

(10) Patent No.: US 7,284,953 B2
(45) Date of Patent: Oct. 23, 2007

(54) DIRT SEPARATOR FOR GAS TURBINE AIR SUPPLY

(75) Inventors: Richard Silverman, Tolland, CT (US);
Barry Beckwith, Coventry, CT (US);
Lisa O'Neill, Manchester, CT (US);
Edward F. Pietraszkiewicz, Southington, CT (US)

(73) Assignee: United Technologies Corporation, Hartford, CT (US)

( * ) Notice: Subject to any disclaimer, the term of this patent is extended or adjusted under 35 U.S.C. 154(b) by 93 days.

(21) Appl. No.: 11/214,238

(22) Filed: Aug. 29, 2005

(65) Prior Publication Data

US 2007/0048124 A1 Mar. 1, 2007

(51) Int. Cl.
*F04D 29/70* (2006.01)

(52) U.S. Cl. .................................. 415/121.2; 60/39.092

(58) Field of Classification Search ............. 415/121.1, 415/121.2, 229, 201; 60/39.092; 55/385.3, 55/437, 439, 462, 463
See application file for complete search history.

(56) References Cited

U.S. PATENT DOCUMENTS

| 3,034,298 | A | * | 5/1962 | White ......................... 60/726 |
| 4,685,942 | A | | 8/1987 | Klassen et al. |
| 4,798,047 | A | * | 1/1989 | Geary ..................... 415/121.2 |
| 6,270,558 | B1 | * | 8/2001 | Theiler ........................ 55/463 |
| 6,698,180 | B2 | | 3/2004 | Snyder |

* cited by examiner

*Primary Examiner*—Edward K. Look
*Assistant Examiner*—Dwayne J White
(74) *Attorney, Agent, or Firm*—Carlson, Gaskey & Olds

(57) ABSTRACT

A gas turbine engine is provided with a radially outer cooling air flow. A dirt separator is placed in the path of the radially outer cooling air flow, and includes a radially outer leg that defines a space to capture dirt or other impurities. A radially inner leg of the dirt separator includes open air flow passages to allow air to flow through the inner leg and downstream to cool various components within the gas turbine engine.

14 Claims, 2 Drawing Sheets

DIRT SEPARATOR FOR GAS TURBINE AIR SUPPLY

BACKGROUND OF THE INVENTION

This application relates to a dirt separator positioned in the path of a radially outer cooling air supply for gas turbine engine components, and wherein the dirt separator ensures that heavier dirt-laden air is not passed downstream to gas turbine components.

Gas turbine engines incorporate a number of components, which operate in a very challenging environment. As an example, a turbine section includes stationary vanes, rotating blades and seals. These components are subject to high temperatures, thermal stresses, etc.

Cooling air passes through cooling channels in the vanes, the blades, and in various seals. The cooling air is supplied from a radially inner location within the engine, and from radially outward locations. For several reasons, the air from the radially outer locations tends to carry more dirt and impurities. In the past, this dirt could clog small cooling channels in the components.

The present invention is directed to separating this dirt from the radially outer air, such that the air delivered to the various components of a gas turbine engine is cleaner.

SUMMARY OF THE INVENTION

In a disclosed embodiment, a dirt separator is secured within a housing for a gas turbine engine, and in the flow path of a radially outer cooling air supply. The disclosed dirt separator is generally vertex shaped, with an outer leg that is generally solid, and an inner leg that is, for the most part, open. The dirt, which is heavier, will tend to be at a radially outermost location in the air flow, and thus will move against the solid outer leg. The cleaner air will move through the perforations in the inner leg, and downstream to cool components such as vanes, rotor blades, blade outer air seals, etc.

In disclosed embodiments of this invention, an opening may be provided in a housing in an area adjacent to the outer leg of the dirt separator. This opening provides access for a cleaning tool to periodically remove separated dirt.

These and other features of the present invention can be best understood from the following specification and drawings, the following of which is a brief description.

DETAILED DESCRIPTION OF THE PREFERRED EMBODIMENT

Figure 1:
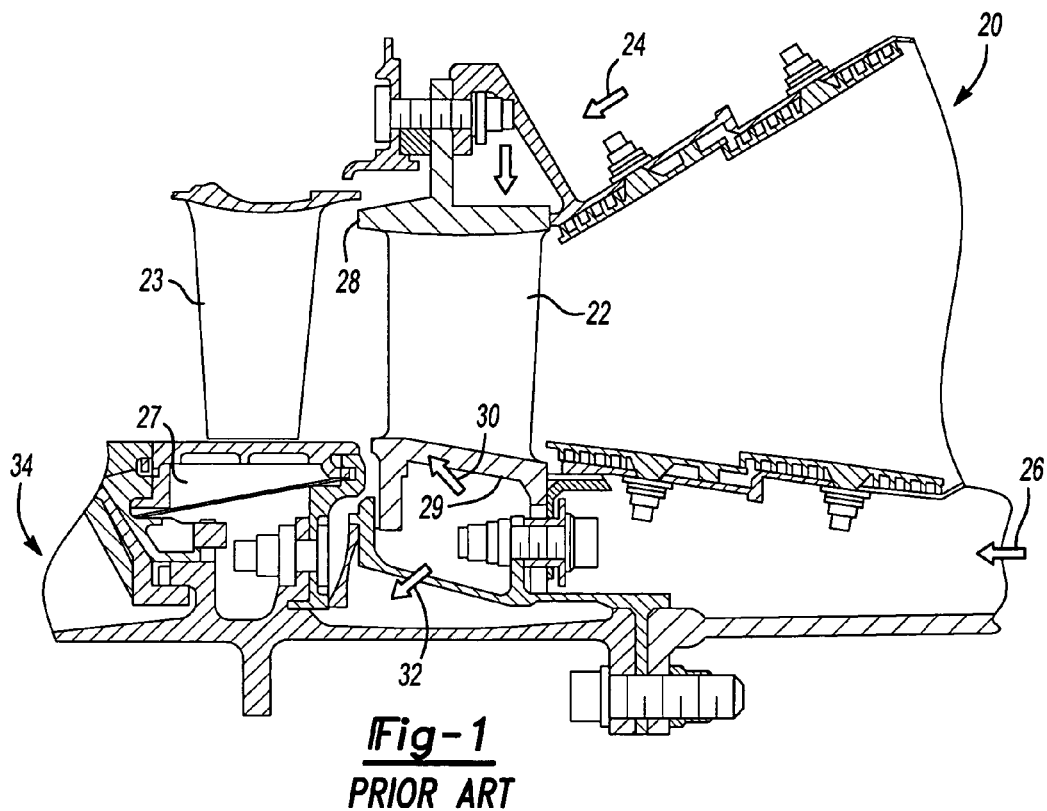
FIG. 1 shows a portion of a prior art gas turbine engine.

A portion of a gas turbine engine 20 is illustrated in FIG. 1. As shown, a vane 22, rotor blades 23, and blade outer air seals 27, are positioned within the gas turbine engine. Cooling air flow for the vanes 22, blades 23 and seals 27 includes both a radially inner source 24 and a radially outer source 26. As known, a portion of the radially outer air flow source 26 may be directed radially inwardly such as at 30 to the vane 22, and radially outwardly at 32, downstream toward the seal 27. The inner supply 24 moves through openings (not shown) in a radially inner surface 28 of the vane 22, and from flow path 30 through openings (not shown) in a radially outer surface 29 of the vane 22.

As is known, the air in outer path 26 tends to carry more dirt than the air in path 24. The air in outer path 26 has been directed from an upstream diffuser. By this point, centrifugal forces have forced heavier, dirty air radially outwardly. The dirt in this cooling air can clog cooling channels in the components.

The present invention is directed in a large part to removing this dirt from the air in outer path 26.

To this end, an inventive gas turbine engine 120 has the same basic structure as the gas turbine structure in FIG. 1. However, a dirt separator 130 is inserted into the flow path 26. An outer leg 134 is generally solid, and defines a space 133 to capture dirt. An inner leg 135 has a number of perforations 136 to allow the air flow 26 to move through the radially inner leg 135. An apex 161 of the dirt separator tends to direct dirt towards outer leg 134 and air towards inner leg 135. A plurality of bolts 138 and 139 secure the dirt separator 130 to housing structure 140.

Air flow 24 continues to flow to the radially inner surface 28 of the vane, and downstream to the rotor blade 23 and seal 27. The outer air flow 26 has now been cleaned of much of the prior art impurities. Thus, the air moving to the outer periphery 29 of the vane 22 at 230 tends to be cleaner, and the air 132 moving further downstream also tends to be cleaner.

Figure 2:
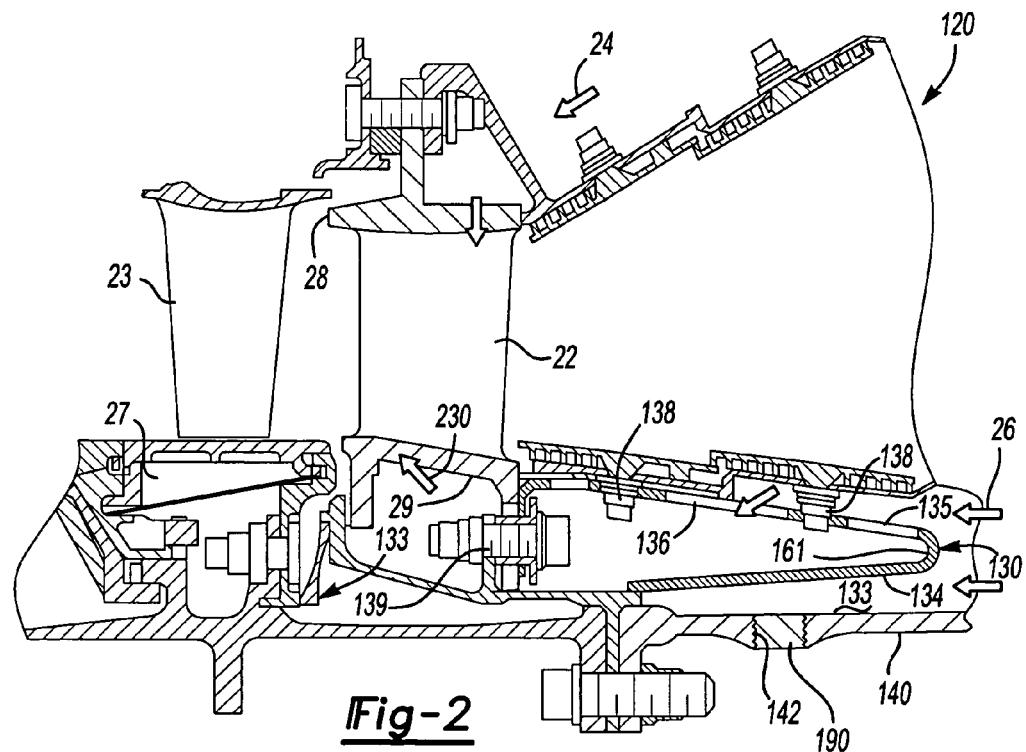
FIG. 2 shows a gas turbine engine incorporating the inventive dirt separator.
Figure 3:
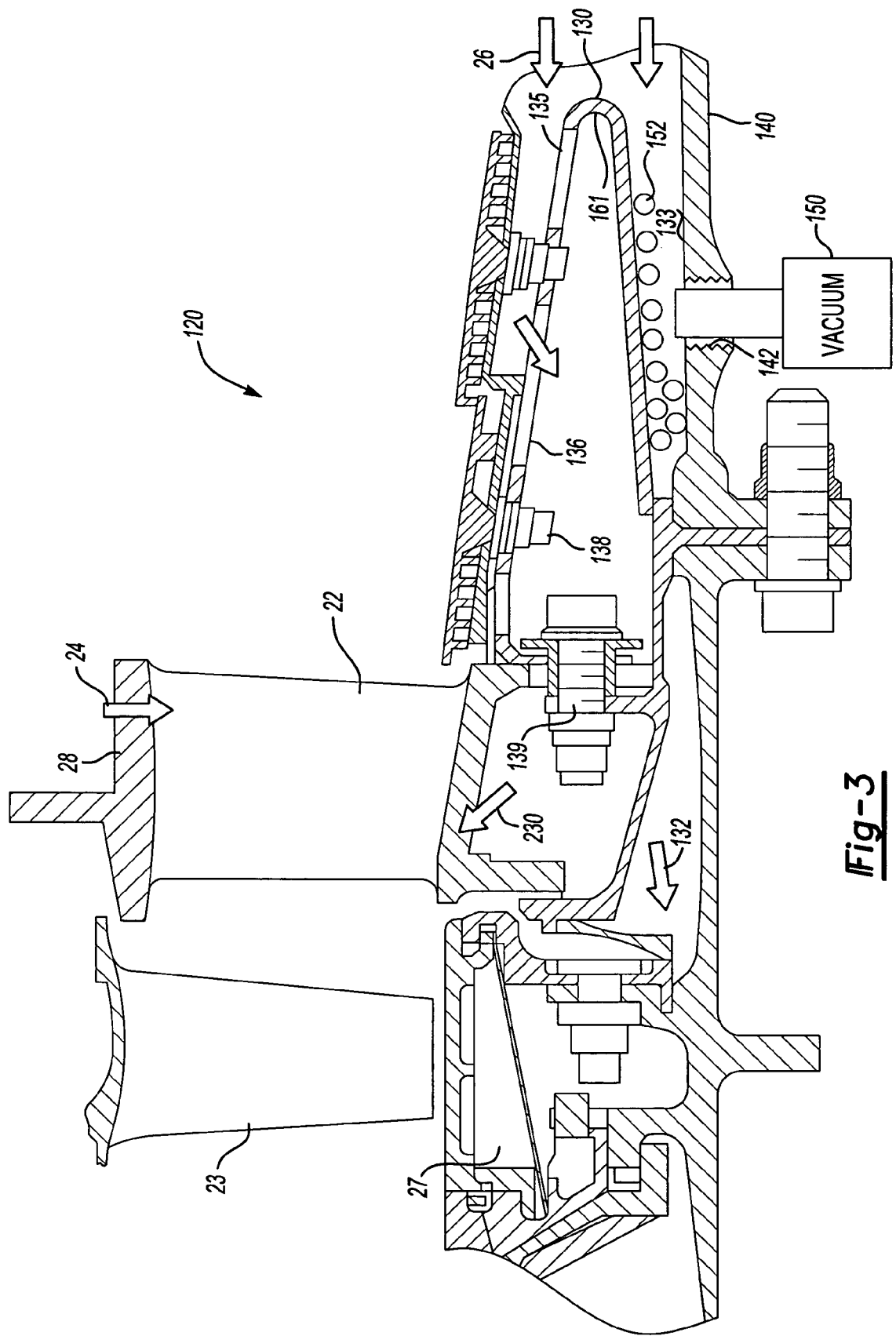
FIG. 3 shows the inventive gas turbine engine being cleaned.

As shown in FIG. 3, an opening 142 in the housing 140 provides an access opening for a vacuum 150 to remove dirt or other impurities 152 from space 133. The opening 142 is shown plugged in FIG. 2 when clearing is not occurring.

The present invention thus provides a simple way of removing a good deal of the dirt that is found in the radially outer air flow, prior to that air flow reaching the cooling chambers. In the past, this dirt may have clogged some of the smaller cooling channels. The present invention thus provides the benefit of reducing or eliminating such clogging.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A gas turbine engine comprising:
   a housing surrounding a stationary vane and a rotating rotor,
   a turbine section including said stationary vane and said rotating rotor;
   at least one of said stationary vane and said rotating rotor being provided with a radially outer cooling air flow from a location adjacent a radially outer position in said housing; and
   a dirt separator positioned in a flow path of said radially outer cooling air flow, said dirt separator being operable to remove impurities from said radially outer cooling air flow, such that air moving downstream of said dirt separator, and toward said at least one of said stationary vane and said rotating rotor carries less impurities, said dirt separator having an upstream end which will separate the cooling air flow into a radially outer flow having more entrained particulates, and a radially inner cleaner cooling air flow.

2. A gas turbine engine comprising:
   a housing surrounding a stationary vane and a rotating rotor, a turbine section including said stationary vane and said rotating rotor;

at least one of said stationary vane and said rotating rotor being provided with a radially outer cooling air flow from a location adjacent a radially outer position in said housing;

a dirt separator positioned in a flow path of said radially outer cooling air flow, said dirt separator being operable to remove impurities from said radially outer cooling air flow, such that air moving downstream of said dirt separator, and toward said at least one of said stationary vane and said rotating rotor carries less impurities; and said dirt separator has a radially outer leg to define a space to capture impurities, and a radially inner leg that includes open space to allow air to flow downstream through said inner leg.

3. The gas turbine engine as set forth in claim 2, wherein an opening is formed in said housing to allow a cleaning tool to communicate with said space and remove captured impurities.

4. The gas turbine engine as set forth in claim 1, wherein a radially inner flow of cooling air also passes to said one of said stationary vane and said rotating rotor.

5. A gas turbine engine comprising:

a housing surrounding a stationary vane and a rotating rotor, a turbine section including said stationary vane and said rotating rotor;

at least one of said stationary vane and said rotating rotor being provided with a radially outer cooling air flow from a location adjacent a radially outer position in said housing;

a dirt separator positioned in a flow path of said radially outer cooling air flow, said dirt separator being operable to remove impurities from said radially outer cooling air flow, such that air moving downstream of said dirt separator, and toward said at least one of said stationary vane and said rotating rotor carries less impurities; and a blade outer air seal being positioned adjacent said rotating rotor, and said radially outer cooling air flow also passing to cool said blade outer air seal.

6. The gas turbine engine as set forth in claim 1, wherein a plurality of bolts secure said dirt separator within said gas turbine engine.

7. A dirt separator for being positioned in a gas turbine engine, comprising:

a dirt separator body including a radially outer leg and a radially inner leg, with said radially outer leg having less open space than said radially inner leg, said radially inner leg having a plurality of open spaces such that said radially outer leg will capture dirt, and said radially inner leg will allow the flow of air therethough, said dirt separator body having structure such that said dirt separator body may be attached within a gas turbine engine.

8. The dirt separator as set forth in claim 7, wherein said radially outer leg is generally solid.

9. A gas turbine engine comprising:

a housing surrounding a stationary vane and a rotating rotor, a turbine section including said stationary vane and said rotating rotor;

said stationary vane being provided with a radially outer cooling air flow from a location adjacent a radially outer position in said housing;

a dirt separator positioned in a flow path of said radially outer cooling air flow, said dirt separator being operable to remove impurities from said radially outer cooling air flow, such that air moving downstream of said dirt separator, and toward said stationary vane carries less impurities;

said dirt separator has a radially outer leg that defines a space to capture impurities, and a radially inner leg that includes open space to allow air to flow downstream through said inner leg; and a blade outer air seal positioned adjacent said rotating rotor, and said radially outer cooling air flow also passing to cool said blade outer air seal.

10. The gas turbine engine as set forth in claim 9, wherein an opening is formed in said housing to allow a cleaning tool to communicate with said space and remove captured impurities.

11. The gas turbine engine as set forth in claim 9, wherein a radially inner flow of cooling air also passes to said stationary vane.

12. The gas turbine engine as set forth in claim 9, wherein said radially outer leg is generally solid.

13. The gas turbine engine as set forth in claim 9, wherein a plurality of bolts secure said dirt separator within said gas turbine engine.

14. The gas turbine engine as set forth in claim 2, wherein said radially outer leg is generally solid to define the space.

* * * * *